Sept. 8, 1959        K. RITTER        2,903,080
DRIVEN TRAILERS

Filed Dec. 13, 1955        2 Sheets-Sheet 1

INVENTOR.
Kaspar Ritter
BY Michael S. Striker
agt.

Sept. 8, 1959  K. RITTER  2,903,080
DRIVEN TRAILERS
Filed Dec. 13, 1955  2 Sheets-Sheet 2

INVENTOR.
Kaspar Ritter
BY
Michael S. Stricker
agt.

United States Patent Office 2,903,080
Patented Sept. 8, 1959

2,903,080

DRIVEN TRAILERS

Kaspar Ritter, Kirchheim, Teck, Germany, assignor to Allgaier-Werke G.m.b.H., Uhingen, Wurttemberg, Germany Application December 13, 1955, Serial No. 552,911

4 Claims. (Cl. 180—14)

The present invention relates to trailers and more particularly to trailers having two or more axles all of which are driven from a drive shaft on a vehicle in front of the trailer.

The constructions of trailers of this type have met with considerable difficulties, especially for trailer types in which the front axle of the trailer is mounted on a swivel bolster so that the front axle may turn in relation to the trailer frame and the rear axle connected thereto. The difficulty of such a construction rests mainly in the difficulty of transmitting a drive from the incoming substantially horizontal drive shaft through a vertical transmission shaft located in the axis of the swivel bolster and from there to the front and rear axles of the trailer. The constructions so far known have a very poor efficiency especially during the drive of the trailer over narrow curves in which the front and the rear axles include a relative great angle with each other.

Another disadvantage of the constructions so far known is that it was not possible to enclose the transmission gearing of such a drive into a closed casing so that the proper lubrication of the gearing becomes very difficult and the gearing itself is subjected to considerable wear.

One object of the present invention is to overcome the above-described drawbacks of the constructions so far known.

A further object of the present invention is to provide a transmission gearing for driving all of the wheel axles of a multiple axle trailer in which one of the axles is mounted for rotation about an axis normal to the wheel axle.

It is an additional object of the present invention to construct such a transmission gearing with a closed casing enclosing all gears of the transmission gearing so that the same can be properly lubricated to prevent excessive wear.

It is yet another object of the present invention to construct such an all enclosed transmission gearing which will operate with high efficiency during all driving conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
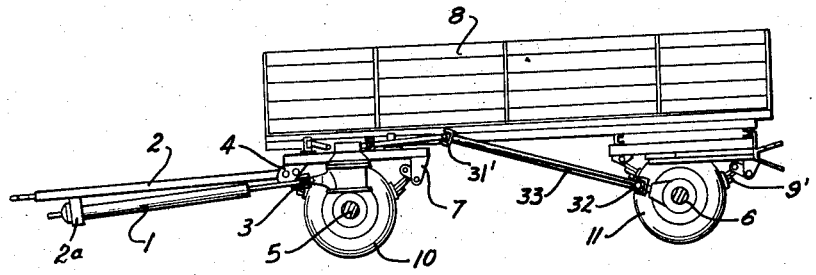
Fig. 1 is a sectioned overall side view of the trailer, the section being taken longitudinally through the trailer.
Figure 2:
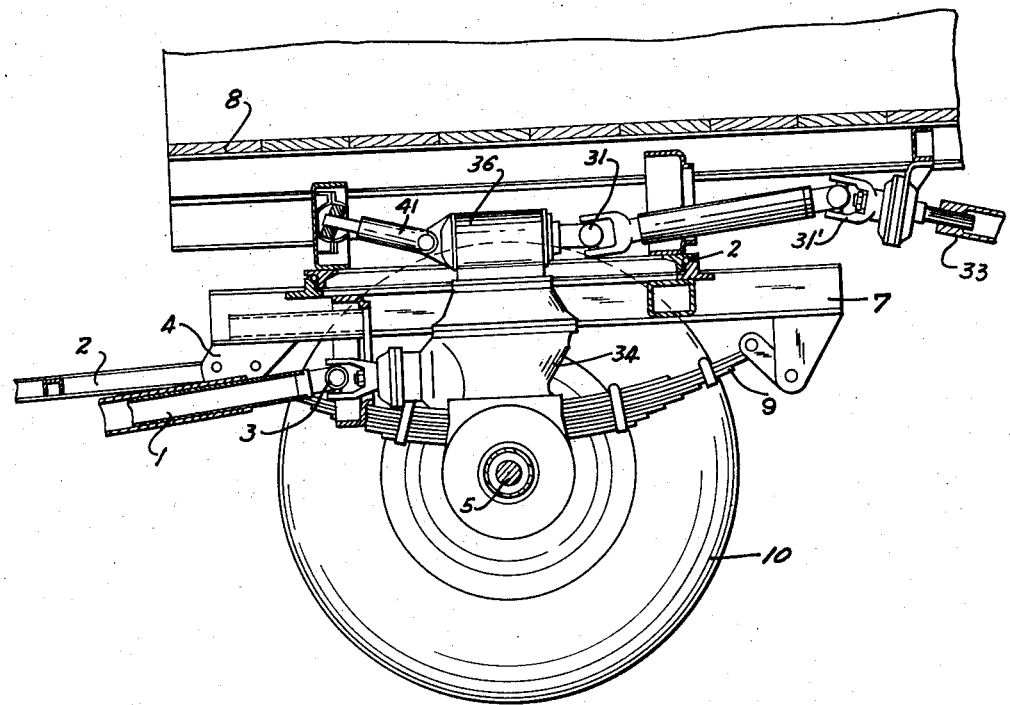
Fig. 2 is a sectioned side view similar to Fig. 1, drawn to an enlarged scale and showing only the front part of the trailer.

Referring now to the drawings, and more particularly to Fig. 1, it can be seen that the trailer comprises front axle means 5 and rear axle means 6 respectively operatively connected to the front wheels 10 and rear wheels 11 of the trailer. The trailer frame means comprise a trailer frame 8 and a swivel bolster or swivel member 7 carried by the front axle means 5. The trailer frame 8 carried in part by the swivel member 7 and a thrust roller bearing 12 is sandwiched between the swivel member 7 and the base of the frame 8 so that the swivel member 7 and the frame 8 may turn relative to each other about an axis normal to the front axle means 5. The front axle means 5 are connected to the swivel member 7 by springs 9 and the rear axle means 6 are suspended from the base of the frame 8 by springs 9'. The trailer is adapted to be connected to a vehicle in front of the same by a connecting pole 2 which is tiltably fastened to the swivel member 7 at 4. Attached to the connecting pole 2 as by bracket means 2a is a drive shaft 1 adapted to be connected to a drive shaft on the vehicle in front of the trailer by any suitable coupling means.

Figure 3:
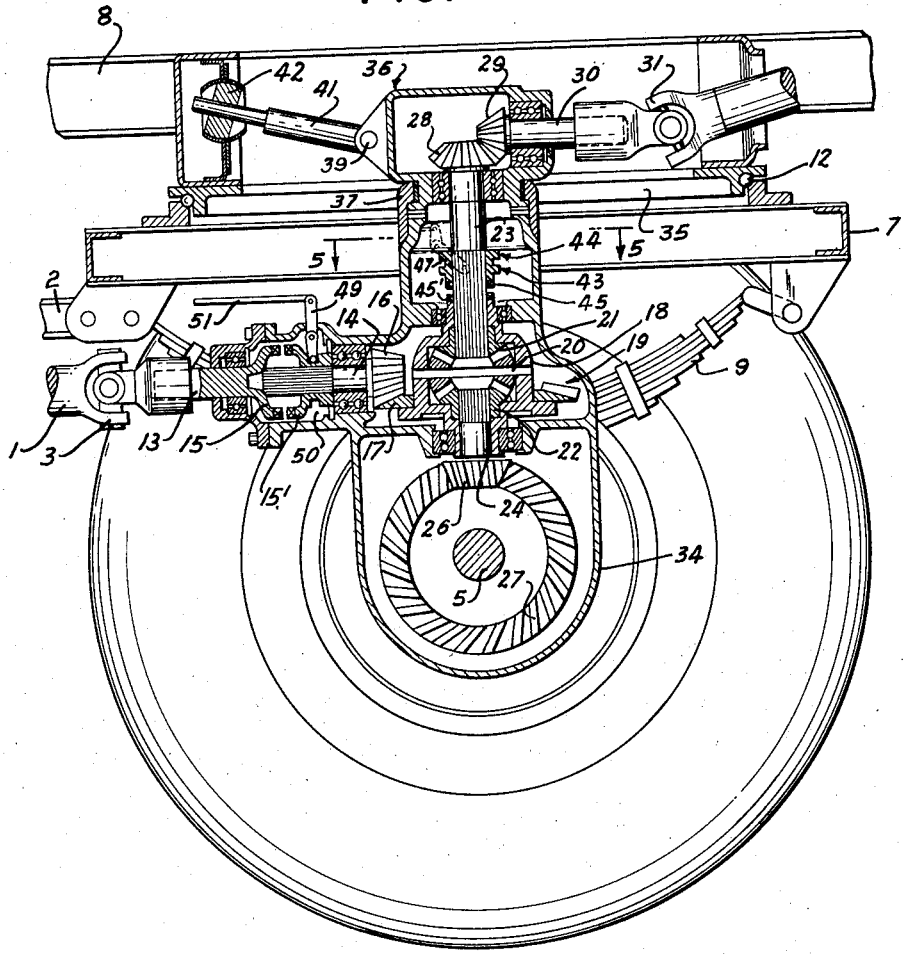
Fig. 3 is a section similar to Fig. 2, drawn to a further enlarged scale, the section being taken through the vertical plane of symmetry of the housing.

The drive shaft 1 is connected over a universal joint 3 to the drive means of the trailer. The drive means include in the preferred form shown in Fig. 3 of the drawings a drive shaft 13 and a stud shaft 14 forming an extension of the drive shaft 13 and turnably connected thereto. Integrally formed on the drive shaft 13 is one-half of a claw coupling 15 and the other half of the claw coupling 15' is shiftably mounted on a splined portion of the stud shaft 14 so that it will rotate together with the same. The free end of the stud shaft 14 carries fixed thereto a bevel gear 16 which meshes with the bevel gear 17 fixed to the housing 18 of the differential means 19.

The differential means 19 comprise besides the differential housing 18 and the aforementioned bevel gear 17 the differential spider 20 driving two differential gears 21 and 22. The driven differential gears 21 and 22 are respectively fixedly connected to the inner ends of output shafts 23 and 24 which have a common axis normal to the axis of the front axle means 5 and coinciding with the axis about which the swivel member 7 may turn relative to the trailer frame 8. The output shaft 24 extending towards the front axle means 5 carries on its lower end a bevel gear 26 meshing with a differential 27 forming part of the front axle means.

The output shaft 23 extending away from the front axle means 5 carries on its upper end a bevel gear 28 meshing with a bevel gear 29 fixedly mounted on a stud shaft 30. This stud shaft 30 is connected by means of universal joints 31, 31' and 32 and a connecting rod 33 to the rear axle means 6.

The shafts 13 and 14 as well as the differential housing 18 of the differential means 19 are mounted for rotation in ball-bearings the outer races of which are mounted in a housing 34. The housing 34 is carried by the front axle means 5 and extends upwardly from the same through an open space 35 in the swivel member 7. The main axis of the housing coincides with the axis about which the swivel member 7 may rotate relative to the trailer frame 8.

Gear support means 36 are provided for turnably supporting the upper end of the output shaft 23 and the stud shaft 30. In the preferred form shown in Fig. 3 of the drawings, this gear support means 36 forms a second housing which is turnably connected to and turns relative to the first housing 34 for turning movement about the axis of the output shafts 23 and 24 and the second housing is further connected to the trailer frame 8 for turning movement with the same. A sealing ring 37 is provided between the first housing 34 and the second housing 36 so that the two housings form an all-enclosed casing which encloses, as can be clearly seen from Fig. 3, all gears of the arrangement.

Figures 4, 5:
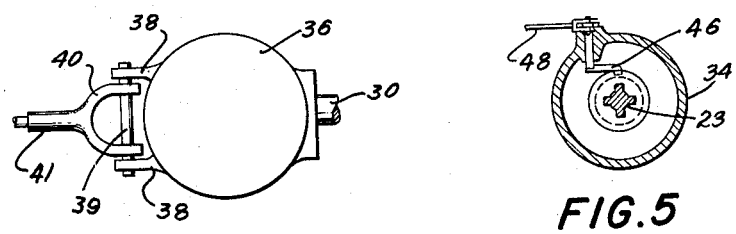
Fig. 4 is a top view of part of the construction shown in Fig. 3.
Fig. 5 is a section taken along the line 5—5 of Fig. 3, viewed in the direction of the arrows.

The second housing is provided on one side with a pair of spaced ears 38 (Fig. 4) which are connected, by means of a pin 39 turnably mounted in aligned holes through the ears 38, to the forked end 40 of a guide pin 41. The other end of the guide pin 41 is connected to the trailer frame 8 by means of a ball joint 42. By means of this arrangement, the second housing 36 is non-rotatably connected to the trailer frame 8 but it may shift together with the first housing 34 in the direction of the main axis of the first housing relative to the trailer frame 8 whenever the front axle means 5, which are connected to the swivel member 7 by means of the springs 9, shift in the direction of the aforementioned axis relative to the trailer frame 8.

Locking means 43 are further provided on the output shaft 23. The locking means 43 consist of a ring member 44 mounted on a splined portion of the output shaft 23 so that this ring member will rotate together with the output shaft 23 but may be moved in longitudinal direction of the shaft 23 towards and away from the upper end of the differential housing 18. The ring member 44 is provided on its bottom face with a plurality of engaging claws 45 which can be brought into engagement with similar claws 45' provided on the upper end of the differential housing 18 by shifting the member 44 from the position shown in Fig. 3 in downward direction. It is clear that when the claws 45 and 45' are brought into engagement the output shaft 23 is locked to the differential housing 18 so that the shafts 23 and 24 will rotate with the same speed. The locking means 43 can be shifted on the output shaft 23 by means of the bent end of a double armed lever 46 engaging in a circumferential groove 47 provided in the ring member 44 as can be best seen from Figs. 3 and 5 of the drawings. The lever 46 is turnably mounted in the upper portion of the housing 43 and can be operated by means of a tie rod 48 connected to the other end of the lever 46 and leading to a convenient place of the trailer frame or to the driver's cab in the vehicle in front of the trailer.

The movable coupling part 15' mounted on the stud shaft 14 can also be operated from the same place as the locking means 43, or any other convenient place, by means of a double armed lever 49 turnably mounted in the housing 34 and engaging with one end into a circumferential groove 50 formed in the coupling part 15' and a tie rod 51 connected to the other end of the lever 49.

The differential means 19 having output shafts 23 and 24 with a common axis coinciding with the axis about which the swivel member 7 may rotate in relation to the trailer frame 8 serve to compensate for the different positions the front axle means 5 and the rear axle means 6 assume when the trailer is driven through curves, they compensate further for the difference in the slip between the front wheels 10 and rear wheels 11, differences in the rolling radius of the front and rear wheels and thereby reduce the torsion stresses resulting in the drive members of the trailer from the above-mentioned various causes.

It will be understood that each of the elements described above, or two or more together, may also find a useful application in other types of trailers differing from the types described above.

While the invention has been illustrated and described as embodied in a trailer having two or more axles all of which are driven from a drive shaft on a vehicle in front of the trailer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a trailer, in combination, axle means extending transversely of the trailer and adapted to be operatively connected to a pair of trailer wheels; an annular swivel member resiliently carried by said axle means over the latter; an elongated housing carried by, secured to and extending upwardly from said axle means and passing through said annular swivel member, said housing and swivel member having a common axis normal to said axle means; a trailer frame carried in part by said swivel member and turnably engaging the latter for turning movement about said axis of said housing so that said swivel member and trailer frame are turnable with respect to each other about said housing axis; differential means located in said housing and being carried thereby, said differential means having a pair of output shafts one of which extends toward said axle means and being operatively connected thereto and the other of which extend away from said axle means, gear support means turnably connected to said housing for turning movement about the axis thereof and connected to said trailer frame for turning movement therewith; and gear means carried by said gear support means and connected to said other output shaft of said differential means for receiving the drive from said differential means in said housing and for transmitting the drive to another axle means of the trailer.

2. In a trailer, in combination, axle means extending transversely of the trailer and adapted to be operatively connected to a pair of trailer wheels; an elongated first housing carried by, secured to and extending upwardly from said axle means, said first housing having an axis normal to said axle means; a swivel member formed with a free space passing therethrough and carried resiliently by said axle means over the latter coaxially with said first housing, said first housing passing with clearance through said free space so that said housing may move in axial direction relative to said swivel member; a trailer frame carried in part by said swivel member and turnably engaging the latter for turning movement about said axis of said first housing so that said swivel member and trailer frame are turnable with respect to each other about said axis of said first housing; a second housing connected to said first housing for turning movement about the axis thereof and connected to said trailer frame for turning movement therewith; differential means located in said first housing and being carried thereby, said differential means having a pair of output shafts one of which extends toward said axle means and being operatively connected thereto and the other of which extend away from said axle means; and gear means carried by said second housing and connected to said other output shaft of said differential means for receiving the drive from said differential means in said first housing and for transmitting the drive to another axle means of the trailer.

3. In a trailer, in combination, axle means extending transversely of the trailer and adapted to be operatively connected to a pair of trailer wheels; an elongated first housing carried by, secured to and extending upwardly from said axle means, said first housing having an axis normal to said axle means; a swivel member formed with a free space passing therethrough and carried resiliently by said axle means over the latter coaxially with said first housing, said first housing passing with clearance through said free space so that said housing may move in axial direction relative to said swivel member; a trailer frame carried in part by said swivel member and turnably engaging the latter for turning movement about said axis of said first housing so that said swivel member and trailer frame are turnable with respect to each other about said axis of said first housing; a second housing turnably connected to said first housing for turning movement about the axis thereof, said first and said second housing forming together a closed casing; connecting means connecting said second housing to said trailer frame for turning movement therewith and for shifting movement together with said first housing in the direction of said axis; differential means located in said first housing and being carried thereby, said differential means having a pair of output shafts one of which extends toward said axle means and being operatively connected thereto and the other of which extend away from said axle means; and gear means carried by said second housing and connected to said other output shaft of said differential means for receiving the drive from said differential means in said first housing and for transmitting the drive to another axle means of the trailer.

4. In a trailer, in combination, axle means extending transversely of the trailer and adapted to be operatively connected to a pair of trailer wheels; a swivel member formed with a free space passing therethrough and carried resiliently by said axle means over the latter; a trailer frame carried in part by said swivel member and turnably engaging the latter for turning movement about an axis normal to said axle means; a first elongated housing coaxial with said swivel member carried by said axle means, secured thereto and extending upwardly therefrom through said free space of said swivel member so that said housing may move in axial direction relative to said swivel member; a transmission shaft rotatably mounted in said first housing and having an axis coinciding with said axis normal to said axle means; gear means interconnecting one end of said shaft with said axle means; a drive shaft rotatably mounted in said first housing in a position normal to said transmission shaft; first bevel gear means located in said first housing and interconnecting said drive shaft with said transmission shaft for driving the latter; a second housing turnably connected to said first housing for turning movement about said axis of said transmission shaft and connected to said trailer frame for turning movement therewith; a stud shaft extending in a direction normal to said transmission shaft turnably mounted in said second housing; second bevel gear means rotatably mounted in said second housing and interconnecting the other end of said transmission shaft with one end of said stud shaft; and transmission means for connecting the other end of said stud shaft with another axle means of the trailer.

References Cited in the file of this patent

UNITED STATES PATENTS

| | | |
|---|---|---|
| 876,351 | Hoedt | Jan. 14, 1908 |
| 893,107 | Snow | July 14, 1908 |
| 1,055,010 | Zoger | Mar. 4, 1913 |
| 1,114,245 | Fitch | Oct. 20, 1914 |
| 1,321,612 | Flavin | Nov. 11, 1919 |
| 2,080,477 | Higgins et al. | May 18, 1937 |
| 2,203,282 | Keese | June 4, 1940 |
| 2,219,533 | Ross | Oct. 29, 1940 |
| 2,724,448 | Rossler et al. | Nov. 22, 1955 |